United States Patent

Weiner et al.

[15] 3,679,877

[45] July 25, 1972

[54] ALPHA RAY PATTERN RECOGNITION SYSTEM

[72] Inventors: Leon Weiner, 5134 Braesheather St., Houston, Tex. 77035; John E. Kilpatrick, Houston, Tex.; Robert J. Spiger, Bellaire, Tex.

[73] Assignee: Weiner, by said Kilpatrick and Spiger

[22] Filed: June 18, 1969

[21] Appl. No.: 834,306

[52] U.S. Cl. ....................235/92 PC, 235/92 R, 235/61.115, 250/106

[51] Int. Cl. ....................G06m 11/04

[58] Field of Search ....................235/92, 61.115; 340/146.3 K, 340/347; 250/83.3, 106

[56] References Cited

UNITED STATES PATENTS

| | | | |
|---|---|---|---|
| 3,028,081 | 4/1962 | Knight | 235/61.115 |
| 2,620,435 | 12/1952 | Vogt et al. | 340/146.3 |
| 3,117,754 | 1/1964 | Morganstern | 340/146.3 |
| 3,305,669 | 2/1967 | Fan | 235/61.115 |
| 3,476,918 | 11/1969 | Howell | 235/61.115 |

*Primary Examiner*—Maynard R. Wilbur
*Assistant Examiner*—Joseph M. Thesz, Jr.
*Attorney*—Kimmel, Crowell & Weaver

[57] ABSTRACT

A system for reading out a pattern of areas each of which may or may not be transparent to alpha rays, by counting the alpha rays passing through each of the areas for a predetermined common time interval, to ascertain for which areas a predetermined count is attained in a predetermined time interval.

13 Claims, 13 Drawing Figures

*INVENTORS*
LEON WEINER,
JOHN E. KILPATRICK
& ROBERT J. SPIGER

By *Kimmel, Crowell & Weaver*
*ATTORNEYS*

INVENTORS
LEON WEINER,
JOHN E. KILPATRICK
& ROBERT J. SPIGER
By
Kimmel, Crowell & Weaver INVENTORS
LEON WEINER,
JOHN E. KILPATRICK
& ROBERT J. SPIGER
By Kimmel, Crowell & Weaver
ATTORNEYS

ALPHA RAY PATTERN RECOGNITION SYSTEM

BACKGROUND OF THE INVENTION

A wide variety of pattern recognition systems exists. They may employ energy sources which transfer energy through a pattern of holes to energy sensors. The outputs of the sensors, on a "go" "no-go" basis, establish whether or not a hole exists at a given location of the pattern. Generally, the energy sources are difficult to control or are bulky and inconvenient. Alpha ray energy sources are available for pattern recognition and these present peculiar advantages. They derive from a device of minimum bulk which requires no energy source and involves no heat dissipation problems, and which has extremely long life. Alpha rays are absorbed completely by a thin sheet of cardboard, but can be reduced in energy by precise amounts on passage through filters or attenuators consisting of sufficiently thin sheets of solid material. A suitable source of alpha rays is Americium 241, which emits at 5.5 MeV. an energy capable of detection by conventional silicon surface barrier detectors. The terms filter or attenuator as used herein refers to any device or screen capable of reducing the energy of elementary particles, such as alpha rays, passing therethrough.

A defect of most pattern recognition devices is that they involve no requirement for continuous sensing for a fairly long time interval, to produce an output signal. They are usually instantaneously acting, and therefore give rise to false signals as transient inputs occur. The alpha ray source emits at random, from any point of its emitting areas, and each emission, consisting of one alpha particle, can be separately detected. According to the present invention, the particles passing through a hole are counted for a predetermined time interval, say the interval during which the hole passes a detector, or an interval established by a timer. During this time, on a statistical basis a given number of alpha rays should have passed through a hole of a given size. These are counted on a preset counter, and if the preset count is attained a output signal occurs, and proceeds to a recorder, a computer or the like, in conventional fashion. Thereby, false or accidental signals due to stray energy signals, or random counter operations, are avoided.

SUMMARY OF THE INVENTION

A system for detecting a pattern of holes by means of alpha rays, in which a predetermined count of alpha particles must be achieved in a predetermined time interval to signal presence of a hole.

DESCRIPTION OF THE PREFERRED EMBODIMENT

Figure 1:
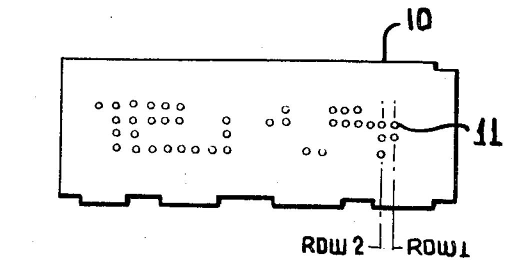
FIG. 1 is a plan view of a typical card, which provides a pattern of holes to be read out.

The system of the invention is designed to read out the positions of holes in a two dimensional pattern of rows and columns on a ticket by reading out simultaneously all the holes of a row and reading the rows in succession. A typical ticket 10 is illustrated in FIG. 1. Five holes 11 may typically exist in each row, and any desired number of rows may be provided. The pattern of holes in a row conveys an item of digital information to a readout, which in turn conveys the digital information to a magnetic tape, or via a suitable line to a computer. The character of the information does not concern the invention, and derives from the use which is to be made of the tickets.

Figure 2:
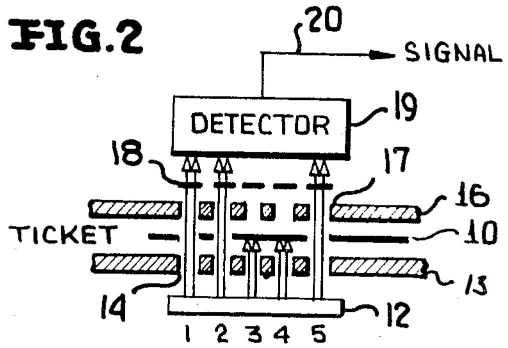
FIG. 2 is a schematic representation of an embodiment of the invention, which reads out rows of holes by applying alpha particles of diverse energies to diverse hole positions.

In a typical readout device, FIG. 2, a source 12 of alpha particles, in this case monoenergetic, in the form of a slab of suitable alpha ray emitting material, is provided. The source 12 underlies a first mask 13, which is fabricated of material opaque to alpha particles except at possible hole locations 14. In the present example five equally spaced holes are employed, which may be slightly smaller than the holes in the card 10. The card 10 is viewed end-wise in FIG. 2, and has holes at positions Nos. 1, 2, 5, positions Nos. 3 and 4 being opaque to alpha rays, because lacking holes. The card is moved into the drawings, by means of a mechanism not illustrated, so that the rows of holes in the card coincide in sequence with the holes 14 in mask 13.

A second mask 16, identical with mask 13 may be superposed over the card 10. Over the holes 17 of mask 16 are located alpha ray attenuators, 18, each of which attenuates alpha rays differently. One attenuator is not needed or has zero attenuation, and the remaining attenuators each attenuates or slows alpha rays by increments of 10 percent so that if position No. 5 is not attenuated, position No. 4 will be at 90 percent alpha energy, position No. 3 at 80 percent, position No. 2 at 70 percent position No. 1 at 60 percent. Clearly, the specified percentages are arbitrary, and any differential of energies may be employed which can be readily and certainly detected and differentiated.

The alpha rays which emerge from the attenuators 18 are detected in a detector 19, which can separate alpha rays on the basis of their energies, and provide output signals on lead or leads 20 to represent hole positions for each row of holes.

Figure 3:
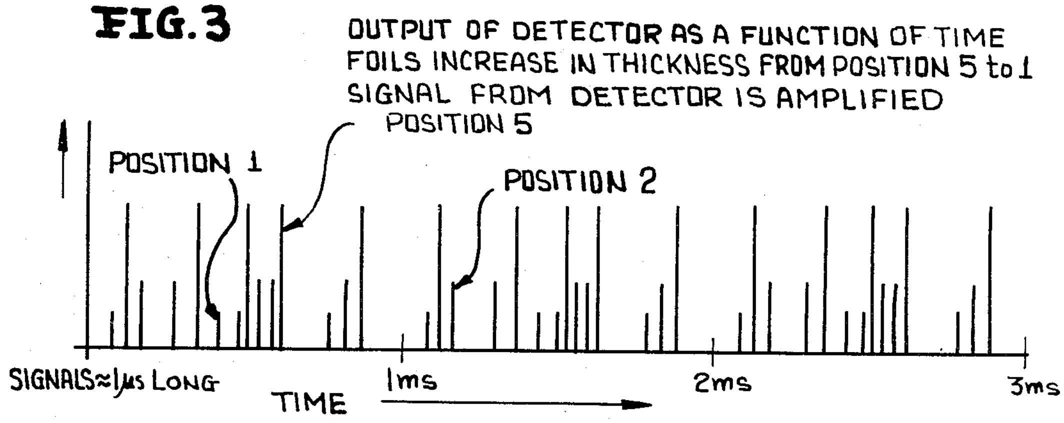
FIG. 3 is a plot as a function of time of the responses of a typical array of holes, in the system of FIG. 2.

The emission of alpha rays from an extended source occurs at random times but with uniform energy. Accordingly, at any given instance of time an alpha ray may impinge on any one hole, or plural rays from diverse parts of the source may impinge on plural holes. Impingement of plural rays coincidentally will seldom occur, and such occurrence is purely fortuitous and does not affect operation of the system. FIG. 3 illustrates a typical distribution of pulses which have passed the attenuators 18 as a function of time, and it can be perceived that in 3 milliseconds 15 pulses have passed the hole No. 1 position. The present invention detects a hole by counting alpha rays passing through the hole over a preset time interval, and generates an output signal only if a predetermined count has occurred.

FIG. 2 is a schematic. A more precise representation of a hole detector is provided in FIG. 4. Here a base 21 has a well 22, at the bottom of which is placed a small mass of Americium 241, which emits alpha rays of uniform energy in MeV. A small opening 23 is provided through the bottom of well 22, from which alpha rays emerge. 10 is a card, which is advanced at known speed by a suitable carriage mechanism, 25, and which contains holes 26. Overlying the carriage 25, is a plate 27, having a well 28, the bottom of which is provided with an opening 29, overlying hole 23. Covering the opening 29 is a foil attenuator 30 of alpha rays of the required thickness to introduce the desired attenuation. A detector 31 sits directly on the foil, and is connected to suitable electronic circuitry. The arrangement assures that no cross talk exists, i.e. that alpha rays destined for one detector position via one card hole, cannot reach another detector position and also protects the alpha ray source and the detector and the rather fragile foil attenuators against mechanical damage, during handling of the equipment.

Figures 4, 5:
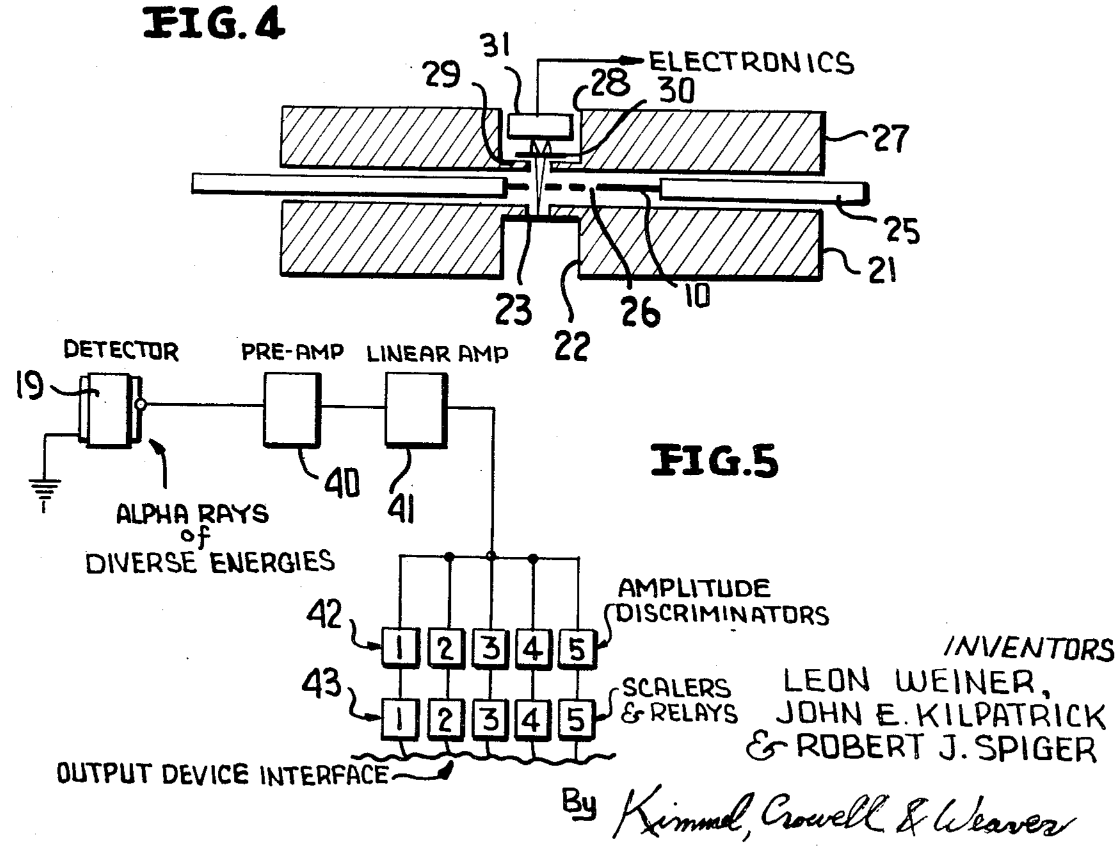
FIG. 4 is a view in transverse section illustrating details of the system of FIG. 2.
FIG. 5 is a block diagram of a complete system of the type illustrated in FIGS. 2 and 4.

While various forms and embodiments of the invention have been devised, as appears hereinafter, in one form such as that of FIGS. 2–4, inclusive, a single detector 10 may be employed for all the holes of a row, the output of the detector consisting of randomly occurring pulses of quantized amplitudes. FIG. 5 illustrates in block diagram a system of this type. The detector 19 supplies a charge preamplifier 40 which responds to a change in charge across the plates of detector 19, itself conventional, to provide an output signal. Acceptance of an alpha ray provides the change in charge. The output of charge amplifier 40 is amplified in linear amplifier 41 to a high enough level to enable amplitude discrimination in single channel analyzers (SCA) 42 of conventional character. Thereby, the five alpha ray energy levels available at detector 19, which are scaled by the attenuators 18 of FIG. 2, are separated into separate channels. The outputs of the amplitude discriminators operate digital counters 43, which in response to predetermined counts only, provide signals to an output device interface, such as a magnetic tape recorder of a computer.

Figures 6, 7, 9:
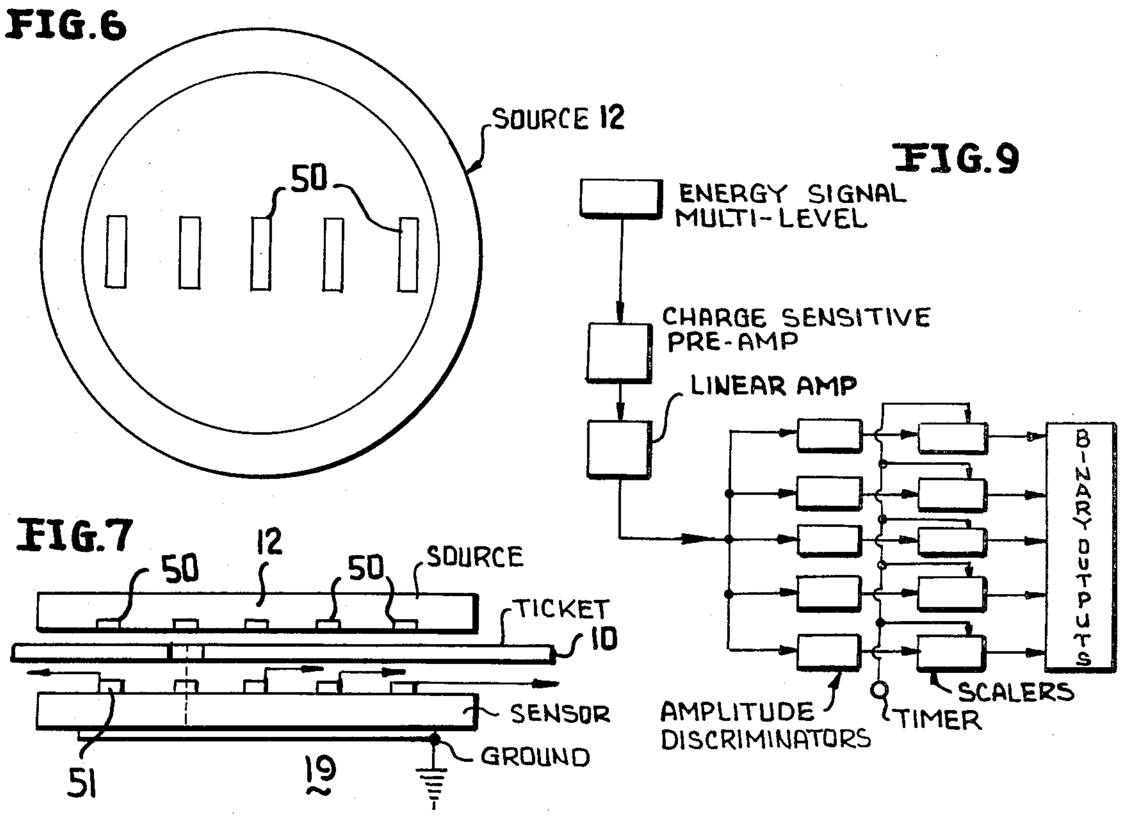
FIG. 6 is a view in plan of alpha ray sources for use in the system of FIGS. 7 and 8.
FIG. 7 is a view in elevation of the sensor mechanism of the system of FIG. 8.
FIG. 9 is an amplification of the system of FIG. 5, employing timed preset counters.
Figure 8:
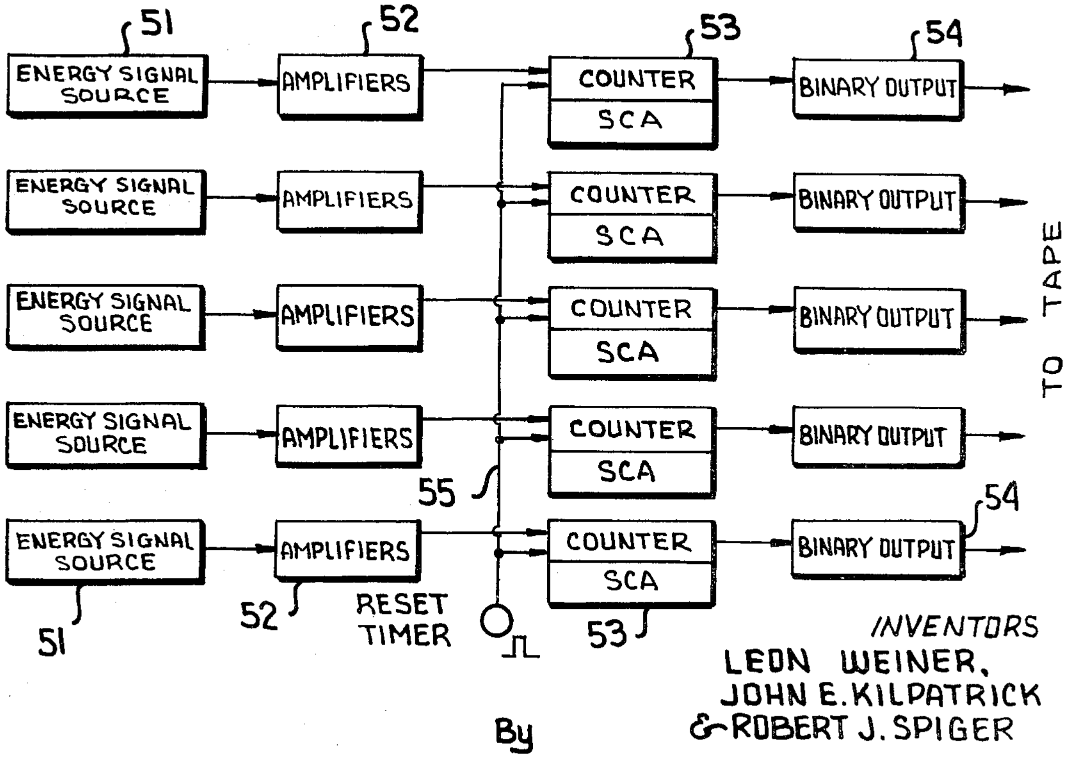
FIG. 8 is a block diagram of an electronic system employed with the sensors of FIG. 7.

While a system employing amplitude discriminators may be employed in conjunction with a single alpha ray detector for detecting attenuated rays from all the holes, a system is illustrated in FIGS. 6–8 in which amplitude discriminators (SCA) may be eliminated, but which requires separate alpha ray detectors for each hole.

FIG. 6 illustrates a typical holder for alpha ray sources 50, which can be discrete, one for each card hole. The sources 50 are illustrated in FIG. 7, applying alpha rays, each via a different hole in ticket 10 to a separate alpha ray detector electrode 51, of a detector 19. The electrodes 51 are labeled "energy signal source" in FIG. 8, since this in in fact their proper functional nomenclature, and these apply signal to suitable charge and linear amplifiers 52, which in turn drive counters 53. Each counter is associated at its input with a single channel analyzer, which is in fact a slicer and removes all signals of less than and greater than a predetermined range of amplitude levels, from the input of the counter. The counters 53 are preset to provide an output signal only on attainment of a preset count, and apply this output to a binary output device, 54, such as a computer or recorder.

The counters are turned on for preset time intervals, by means of control pulses provided on lead 55, the control pulses being initiated and terminated in synchronism Typically, movement of holes past the sensor, so that the counter can only count while a hole is being sensed. Typically, a count of 16 ought to be deemed adequate in assuredly reading out a hole. The counters then might have each a total count of 16, following which an output signal would appear, i.e. the last stage of the counter is the signal output stage. The counter is then normally enabled and is reset following scanning of each hole. If the counter has attained a count of 16 an output signal is recorded. If not, no output signal appears and the count is lost or erased by the timer signal at 55. In this sense it is not necessary to use a counter with a preset count output with the counter having a count capability greater than the preset count, and the counter need not be enabled at the start of a hole scan, although this may be done, if desired.

Figures 10, 11, 12, 13:
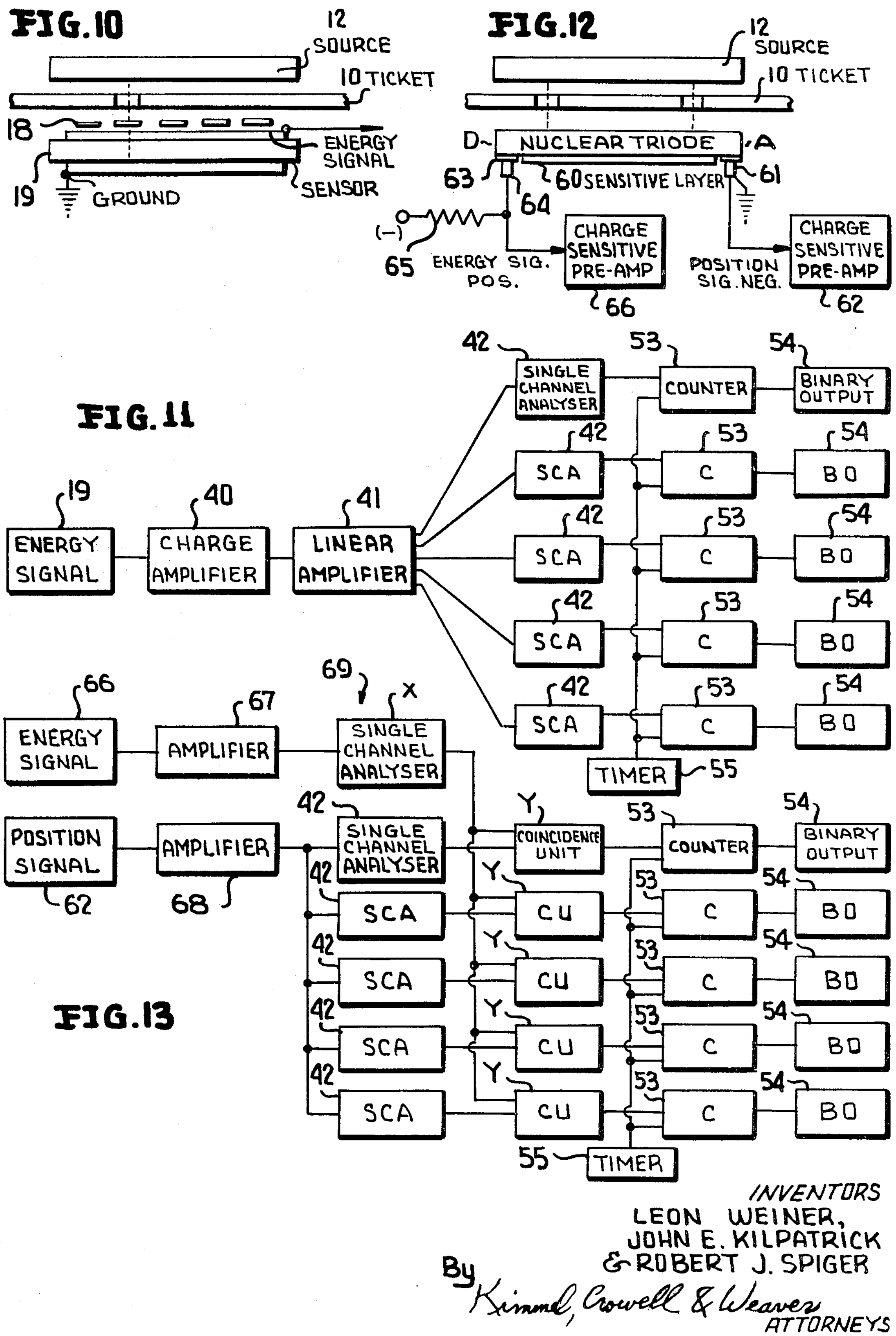
FIG. 10 is a view in side elevation of a sensor array of the type employed in FIG. 2, indicating the presence of a typical surface barrier layer detector.
FIG. 11 is a block diagram of a modification of the system of FIG. 5 employing timed counters and providing binary output.
FIG. 12 is a view of a further modification of the invention employing a position sensitive particle detector.
FIG. 13 is a block diagram of an electronic system appropriate to the detector of FIG. 12.

FIG. 10 illustrates schematically the system of FIG. 2 and therefore is not further described. FIG. 11 illustrates the electronics of FIG. 10, employing hole position discriminators 42 in the form of single channel analyzers (see FIG. 5) and preset counters 53 driving binary output devices 54 (see FIG. 8).

The systems of FIGS. 8 and 11 represent variants of a basic concept, which finds further extension in the embodiments of FIGS. 12 and 13, which employs a silicon surface barrier detector of alpha rays which is capable of measuring simultaneously the energy of a particle and its position of impact, providing different amplitudes of output signal for different positions of impact of alpha particles along the detector. A suitable detector, called a nuclear triode, is used to provide a signal of amplitude specific to each hOle position.

In the nuclear triode, presently commercially available, a high resistive layer 60 is applied to the back of a surface barrier detector D at the depleted region. For detected energies greater than 3.5 MeV about 1 percent resolution in position can be obtained. The resistive layer 60 presents two different paths for charge to pass through, from the point of impact of an alpha ray. These paths act as a voltage or charge divider so that an inverse relation exists for the position of impact of an alpha particle with respect to point A. The position signal therefore can be taken out through a connector 61 and applied to a charge sensitive amplifier 62. The signal appears as a negative signal. At the same time a signal is taken off directly from the body of the detector via electrode 63 and connector 64. This signal is arranged to be positive by applying the signal across a load resistance 65 (22 Megohms) which leads to a negative voltage and directly to a charge sensitive amplifier 65. The two available energy signal sources are identified on FIG. 13 as 62 and 66, respectively, and the linear amplifiers 67, 68 are provided to increase the signals to the levels required by the position or amplitude level discriminators 69.

The output of amplitude discriminator 69 is then counted at the five preset levels available as in the system of FIG. 11.

Referring again to FIG. 13, the energy signal source 66, and the position signal 62 are connected via separate amplifiers to single channel analyzers, labeled X for the energy signal, and 42 for the separate position sensitive signals. The total range of possible signals is thereby allocated to six channels, at six distinct levels. The output of the single channel analyzer X is applied to five coincidence gates, Y, to separate ones of which the outputs of the single channel analyzers 42 are applied. The gates Y operate counters 53.

It then follows that the position signals serve to gate through the energy signal, at the level of the latter, to the counters, which can thus all operate at the same signal level, simplifying circuit design and reducing possible errors. At the same time noise signals are eliminated because these will either not occur coincidentally at single channel analyzer X and at analyzers 42, or will not have the proper levels to pass the analyzers. A noise pulse can only affect the counters if it is at a level in the energy signal channel, which can pass SCA X, while also appearing coincidentally in the position signal channel at one of the five preset levels. The probability of this occurring is negligible.

I claim:

1. A pattern recognition system, including:
a source of alpha particles,
said pattern including plural areas each selectively transparent and opaque to said alpha particles,
alpha particle detection means,
said pattern being positioned in intercepting relation to said alpha rays between said source and said detection means,
counter means responsive to said detection means,
said counter means including means for separately counting alpha particles falling on said detection means which specifically pertain to each of said areas,
said means for separately counting being arranged to provide an output signal only on attainment of a predetermined alpha ray count in a predetermined time interval, and
output circuit means connected to each counter means to convey an output signal in response only to said attainment and indicative of the characters of the specific separate area or areas of said pattern in respect to transparency and opacity to said alpha rays.

2. The combination according to claim 1, wherein said pattern is a pattern of holes in a ticket.

3. The combination according to claim 1, wherein said detection means is a nuclear triode.

4. The combination according to claim 1, wherein said detection means includes a discrete detector for each of said areas.

5. The combination according to claim 1, wherein said detection means is a single detector and wherein alpha ray attenuators of different energy degradating properties are interposed between each of said areas and said single detector.

6. The combination according to claim 1, wherein said detection means is a single detector providing diverse levels of electrical signal output in response to alpha ray inpingement on different areas of said single detector.

7. The combination according to claim 1, wherein said detection means is a silicon surface barrier detector capable of detecting energy of each alpha ray particle and its position of impact simultaneously.

8. The combination according to claim 1, wherein each of said counters is preceded by an amplitude discriminator for discarding all pulses of below a predetermined amplitude, representing noise.

9. The combination according to claim 1, wherein each of said counters is preceded by an amplitude discriminator for discarding all pulses of below a predetermined amplitude, and above a higher predetermined amplitude, representing noise.

10. The method of reading out an array of areas each occupied by a hole or from which a hole is absent, comprising deriving a set of alpha particles of diverse and readily distinguishable energy levels passing through different ones of the areas outlined by different ones of said holes, each area being identified by an energy level which is readily distinguishable from the levels allocated to others of the holes, detecting all the particles in a single detector which provides output electrical pulses per particle which are of different amplitudes to represent different ones of the areas of said array, segregating the output electrical signals of different amplitudes into diverse channels, and counting the output signals in the diverse channels each for a predetermined substantial time interval sufficient to achieve a count greater than five.

11. A method for detecting a pattern consisting of plural holes and non-holes in discrete areas of the pattern, comprising passing alpha rays toward each of the discrete areas of the pattern, said alpha rays being capable of passing through the holes only and not through the nonholes, modulating the alpha rays passed through the holes to have discrete readily distinguishable energies each representative of the location of one of the areas within the pattern, separately translating the energies of said alpha rays into electrical signals of diverse and readily distinguishable amplitudes, separately integrating said electrical signals in separate channels allocated to said diverse amplitudes for predetermined finite and substantial times, and operating separate circuits for each separate channel only when the integrated electrical signal provided by that channel achieves a substantial predetermined level for a predetermined finite and substantial time, the level being selected to eliminate operations of said circuits due to noise.

12. The method according to claim 11, wherein the integrations are accomplished by scalers arranged to provide control signals for said devices only if a predetermined count is achieved in a predetermined time.

13. The method according to claim 11, including the step of moving the pattern past a sensing position, wherein each of said times is measured as the time required to move one of said areas past said sensing position.

* * * * *